United States Patent
Nigro

(10) Patent No.: US 10,410,555 B2
(45) Date of Patent: Sep. 10, 2019

(54) REMOVABLE ACCESSORY MOUNT

(71) Applicant: Ronald P Nigro, Pembroke Pines, FL (US)

(72) Inventor: Ronald P Nigro, Pembroke Pines, FL (US)

(*) Notice: Subject to any disclaimer, the term of this patent is extended or adjusted under 35 U.S.C. 154(b) by 0 days.

(21) Appl. No.: 15/430,435

(22) Filed: Feb. 10, 2017

(65) Prior Publication Data

US 2017/0154553 A1 Jun. 1, 2017

Related U.S. Application Data

(63) Continuation-in-part of application No. 14/019,464, filed on Sep. 5, 2013, now abandoned.

(51) Int. Cl.
| | |
|---|---|
| *A42B 1/24* | (2006.01) |
| *G09F 21/02* | (2006.01) |
| *F16M 13/02* | (2006.01) |
| *G09F 3/12* | (2006.01) |
| *G09F 7/18* | (2006.01) |

(52) U.S. Cl.
CPC ............ *G09F 21/02* (2013.01); *F16M 13/02* (2013.01); *G09F 3/12* (2013.01); *G09F 2007/1852* (2013.01); *G09F 2021/023* (2013.01)

(58) Field of Classification Search
CPC .......... A42B 1/248; A42B 1/24; A42B 1/064; Y10T 24/2708; Y10T 24/19; Y10T 428/24017; A41D 2300/32
See application file for complete search history.

(56) References Cited

U.S. PATENT DOCUMENTS

| | | | | |
|---|---|---|---|---|
| 2,339,364 A * | 1/1944 | William | ............... | A44B 1/30 242/614 |
| 2,693,654 A * | 11/1954 | Clark | ............... | A44B 1/28 224/183 |
| 3,111,736 A * | 11/1963 | Budreck | ............... | A44B 15/002 24/303 |
| 3,129,477 A * | 4/1964 | Mitsuo | ............... | A44C 5/2076 24/303 |
| 3,239,178 A * | 3/1966 | Pompa | ............... | F16B 47/003 211/1 |
| 4,961,275 A * | 10/1990 | Klein | ............... | A44C 3/001 40/1.5 |
| 5,282,616 A * | 2/1994 | Stacavich-Notaro | .... | A44C 1/00 24/306 |
| 5,974,634 A * | 11/1999 | Eisenpresser | ............... | A44B 1/04 24/303 |

(Continued)

*Primary Examiner* — Brian D Mattei
*Assistant Examiner* — Daniel J Kenny
(74) *Attorney, Agent, or Firm* — Mark Terry

(57) ABSTRACT

A removable accessory mount that includes and outside support on the outside of an item that is secured to an inside support located on an inner surface of the item. The inside and outside supports are secured to one another via a support post that can be a threaded post, a pin, etc. The outer surface of the outside support attaches to accessories that can be removed from the outside support and replaced with other items. Likewise, the accessories can be moved to other accessory mounts. In addition, the accessory mount can also be moved from one item to another without substantial damage due to the small nature of the support post that secures the inside and outside supports together.

6 Claims, 16 Drawing Sheets

(56) References Cited

U.S. PATENT DOCUMENTS

| | | | | |
|---|---|---|---|---|
| 6,175,963 B1 * | 1/2001 | Loeffelholz | A41D 27/08 | |
| | | | | 2/200.1 |
| 6,282,760 B1 * | 9/2001 | Mars | A44B 9/16 | |
| | | | | 24/303 |
| 6,422,955 B1 * | 7/2002 | Lopez | A42B 1/24 | |
| | | | | 224/918 |
| 6,632,168 B2 * | 10/2003 | Roberts | A61N 2/008 | |
| | | | | 600/15 |
| 7,120,972 B2 * | 10/2006 | O'Banion | A42B 1/24 | |
| | | | | 24/303 |
| 8,161,909 B2 * | 4/2012 | Sprung | A47L 1/15 | |
| | | | | 119/264 |
| 8,555,471 B2 * | 10/2013 | Rojdev | A61G 17/04 | |
| | | | | 27/14 |
| D739,222 S * | 9/2015 | Chadbourne | D8/394 | |
| D805,882 S * | 12/2017 | Berry | D8/382 | |
| 2001/0034894 A1 * | 11/2001 | Godfrey | A42B 1/248 | |
| | | | | 2/209.13 |
| 2009/0108968 A1 * | 4/2009 | Tsai | G09F 7/04 | |
| | | | | 335/219 |
| 2015/0113843 A1 * | 4/2015 | Berry | G09F 7/04 | |
| | | | | 40/600 |

* cited by examiner

Figure 4A
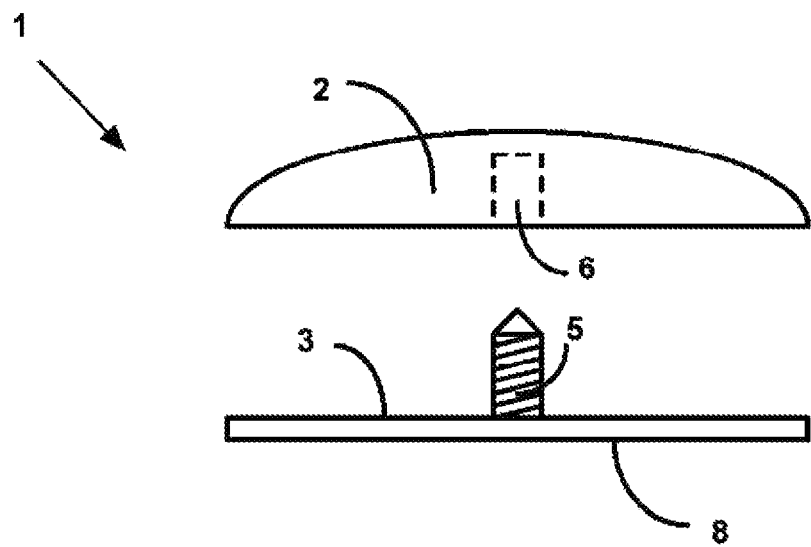
Figure 4B
Figure 4C
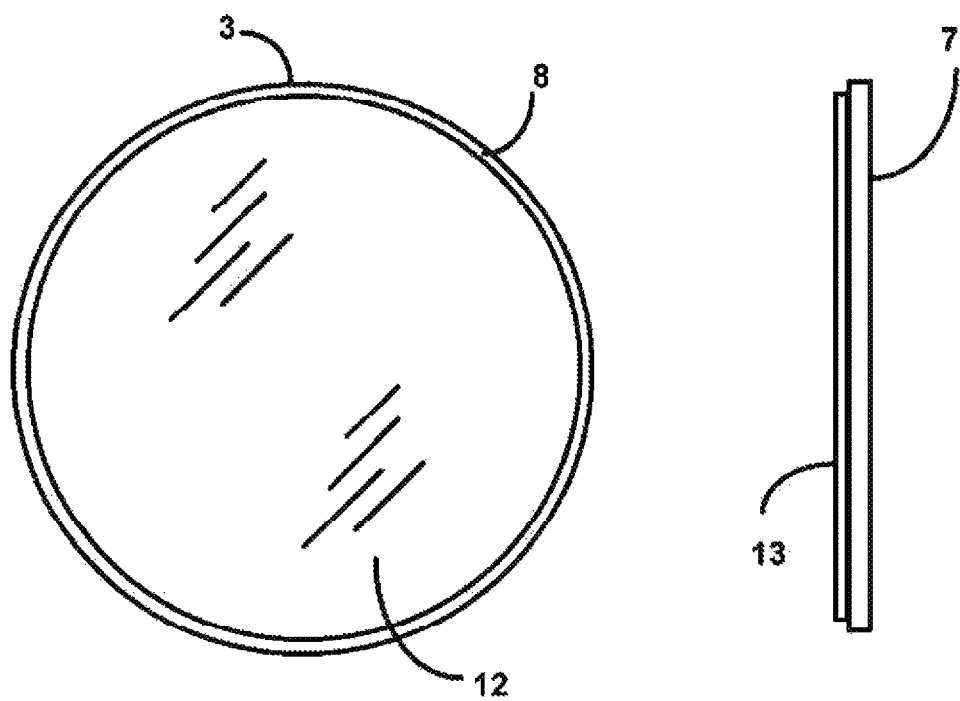

REMOVABLE ACCESSORY MOUNT

CROSS-REFERENCE TO RELATED APPLICATIONS

This Continuation-in-Part (CIP) application is related to, and claims the benefit of, the non-provisional patent application entitled "Removable Accessory Mount," filed Sep. 5, 2013, bearing U.S. Ser. No. 14/019,464 and naming Ronald P. Nigro, the named inventor herein, as sole inventor, the contents of which is specifically incorporated by reference herein in its entirety.

BACKGROUND

Technical Field

This invention relates to accessory mounting devices. More particularly, this invention relates to removable accessory mounts that can be relocated from one item to another, and which further contain a variety of attachment surfaces for removably attaching an accessory to the accessory mount.

Background of the Invention

Many individuals like to show their support for causes and organizations they favor. For example, sports fans may wish to show their support for their local team. Some may wish to show support for their local community, or a community they have visited on vacation, social issues they believe in, and/or political opinions, etc. One form of showing their support is to use patches with logos, insignias, colors, etc.

Unfortunately, the conventional method of simply sewing a patch on an item, such as a cap, a shirt, a jacket, a backpack, etc. creates a permanent attachment which limits the use of the item to which the patch is attached. For example, an individual may want to use a patch with a football team's logo during football season, and have a different patch during basketball season. The same applies to political issues where an individual might wish to temporarily use a patch that supports. The disadvantage of sewing on a patch is that it is permanent and cannot be changed depending on the needs and wishes of the user. As a result, once an individual, such as a sports fan, sews an insignia on a hat, that that is not very useful for other sports in different sports' seasons. It would be advantageous to have a method of changing the insignia quickly and conveniently without the disadvantages of permanently sewing on a patch.

In addition, there are other items aside from hats or caps to which an individual may want to secure a patch. For example, the individual may wish to secure a patch to a shirt, a jacket, a coat, a backpack, etc. It would be advantageous to have a patch that can be easily relocated from one type of item to another.

Another disadvantage associated with the prior art is that attachment of patches often damages the item that the patch is attached to. It would be desirable to have a method of removably attaching a patch without causing any significant damage to the item it is attached to, or preferably, not causing any damage whatsoever to the item it is attached to.

Patches are only one type of item that an individual may wish to attach to an object. In addition to patches, a user may wish to attach any number of useful items to an object such as a cap, a hat, backpack, etc. For example, verse objects, such as printed material, decorative artwork, and even electronic devices could be attached to an object. It would be desirable to have a single type of support structure that could attach any number of useful objects to an item.

An example of another type of item that a user may wish to display is printed material. For example, a sports fan may wish to display an item such as a baseball card, someone at a business meeting may wish to display a business card or a card identifying him by name and/or company, etc. For ease of discussion, the term baseball card shall be used to describe any collectable card related to any sport, and not limited to the game of baseball.

An individual may wish to have a convenient way to attach an item such as an audio video device, and illumination device, such as an LED light, or if not Bluetooth device to allow audio data to the output separate from the Bluetooth transmission device (e.g., iPod™, MP3 player, etc.).

The prior art has failed to provide method of attaching useful items, such as patches printed materials, audio/video devices, Bluetooth devices, illumination devices, and/or other objects such that can be easily removed and transferred to other items with minimal damage to the underlying support structure (e.g., hat, luggage, backpack, etc.).

SUMMARY OF THE INVENTION

The invention provides an accessory mount that includes an outer support on the outside of an item that is secured to an inner support located on an inner surface of the item. The outer and inner supports are secured to one another via a support post that can be a threaded post, a pin, a magnet, etc. The outer support of the accessory mount attaches to items that can be detached from the outer support and replaced with other items. Likewise, the items can be moved to other accessory mounts. In addition, the accessory mount can be moved from one item to another without substantial damage due to the small nature of the support post that secures the inner and outer supports together.

BRIEF DESCRIPTION OF THE DRAWINGS

FIG. 4A illustrates yet another alternative embodiment of the accessory mount illustrated in FIG. 1A. This embodiment uses adhesive to secure the patch to the outside support.

FIG. 4B illustrates a surface view of the outer surface of the outside support.

FIG. 4C illustrates an edge view of a patch that has adhesive on one side that secures to the outer surface of the outside support.

DETAILED DESCRIPTION OF THE PREFERRED EMBODIMENT

Figure 1A:
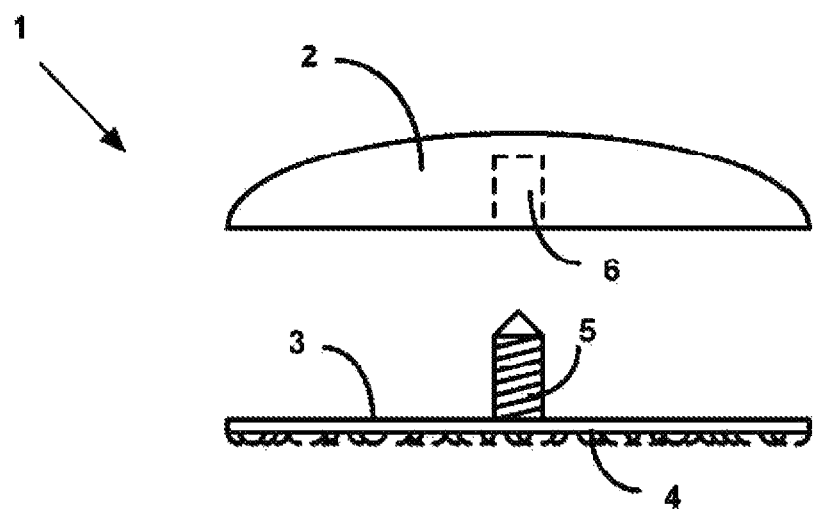
FIG. 1A illustrates a side plan view of the accessory mount that shows the inside support, the outside support, the support post, and hook and loop material extending from the outer surface of the outside support.

In regard to FIG. 1A, this figure illustrates a side plan view of the accessory mount 1 that shows the inside support 2, the outside support 3, the support post 5, and hook and loop material 4 extending from the outer surface of the outside support 3. Also shown it is the threaded channel 6 that accepts support post 5 when the outside support 3 is secured to the inside support 2. For ease of illustration, the support post 5 is not drawn to scale. Further, those skilled in the art will recognize that while a threaded support post 5 can be used, any suitable attachment method can be used, including pins, clamps, magnetic attachment devices etc. The figure also shows hook and loop material 4 extending from the outer surface of the outside support 3. The layer of hook and material 4 on the outside support 3 can be conventional hook and loop material, or it can be molded as part of the outside support 3.

When an individual desires to attach a removable item to a garment, backpack, etc., the support post 5 is pressed through the garment, backpack, etc., and secured to the inside support 2. In practice, the support post 5 would be very narrow whether it is a threaded post or a pin. By using a very narrow support post 5, only minimum damage will be done to the item. Once the accessory mount 1 is secured to the garment, backpack, etc., a patch 7 (or other item) can be secured to the accessory mount 1. When the user decides to change the patch 7 or other item, the patch 7 is merely peeled off and replaced with a new patch 7. Likewise, the accessory mount 1 can be removed altogether.

Figure 1B:
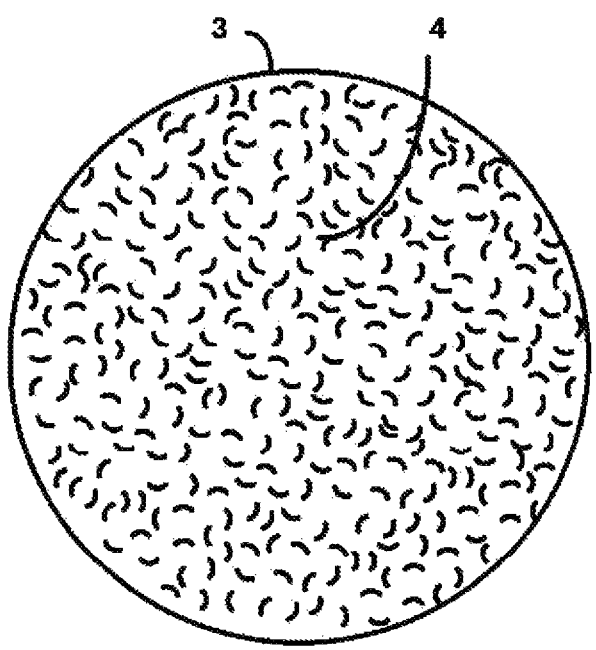
FIG. 1B illustrates a surface view of the outer surface of the outside support whose surface is fabricated from hook and loop material.

FIG. 1B shows a surface view of the outer surface of the outside support 3 whose surface is hook and loop material 4. As mentioned above, the hook and loop material 4 can be a conventional piece of hook and loop material that is commonly marketed as Velcro™. However, those skilled in the art will recognize that the outside support 3 can be molded such that the hook and loop material 4 is an integral part of the outside support 3.

Figure 1C:
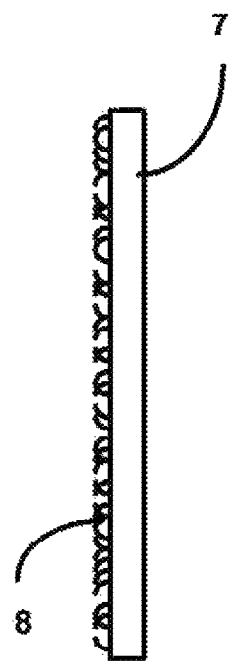
FIG. 1C illustrates an edge view of a patch that has hook and loop material on one side that secures to the hook and loop material on the outside support.

FIG. 1C illustrates an edge view of the patch 7 that has hook and loop material 8 on one side that secures to the hook and loop material 4 on the outside support 3.

As can be seen, once the accessory mount 1 is secured, a variety of patches 7 (or other items) can be quickly and easily substituted for one another depending on the needs of the user.

Figure 2A:
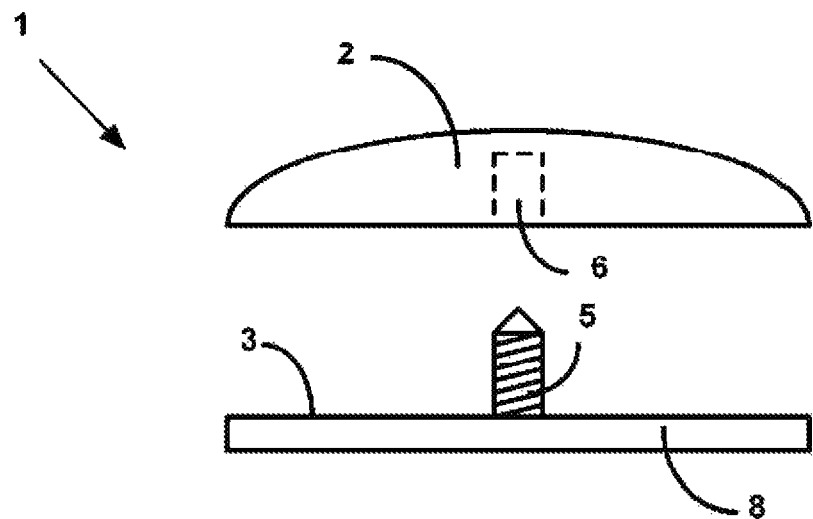
FIG. 2A illustrates an alternative embodiment of the accessory mount illustrated in FIG. 1A in which an exterior rim is added.

FIG. 2A illustrates an alternative embodiment of the accessory mount 1, illustrated in FIG. 1A, in which an exterior rim 8 is added. The rim 8 provides a neater appearance, and also makes it easier to align the patch 7 with the edge of the outside support 3.

Figure 2B:
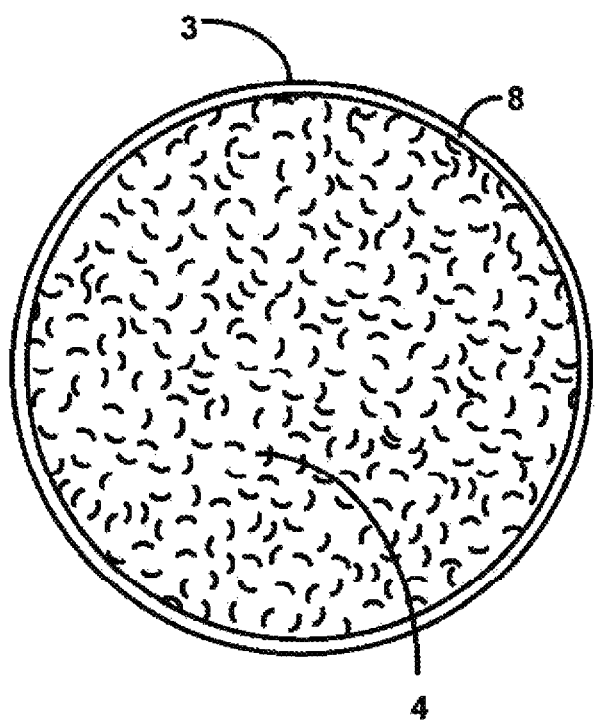
FIG. 2B illustrates a surface view of the outer surface of the outside support whose surface is hook and loop material, and which further has a rim extending around the perimeter of the outside support.

FIG. 2B illustrates a surface view of the outer surface of the outside support 3 whose surface is hook and loop material 4, and which further has a rim 8 extending around the perimeter of the outside support 3.

Figure 2C:
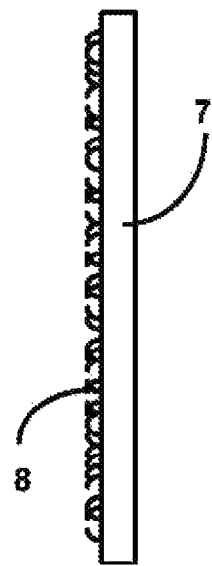
FIG. 2C illustrates an edge view of the patch that has hook and loop material on one side that secures to the hook and loop material on the outside support.

FIG. 2C illustrates an edge view of the patch 7 that has hook and loop material 8 on one side that secures to the hook and loop material 4 on the outside support 3. In this embodiment, the hook and loop material 8 does not extend to the edge of the patch 7 such that it does not interfere with contact between the patch 7 and the rim 8. Those skilled in the art will recognize that the patch 7 can alternatively be sized such that it fits within the rim 8. In that case, the hook and loop material 8 would extend to the edge of the patch 7.

Figure 3A:
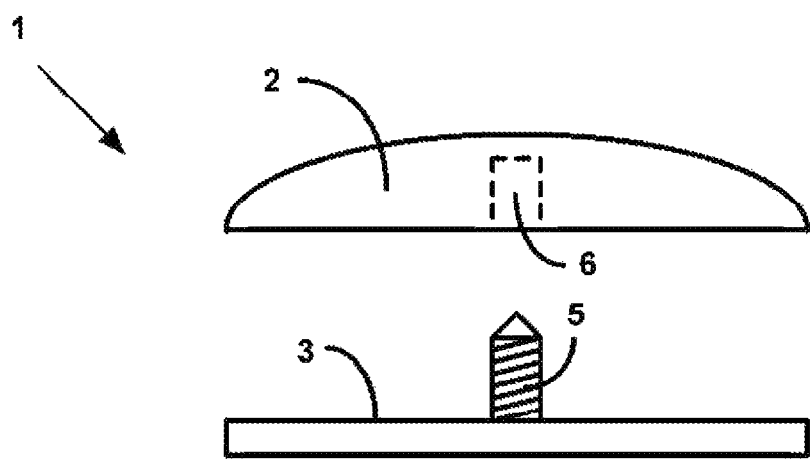
FIG. 3A illustrates another alternative embodiment of the accessory mount illustrated in FIG. 1A. This embodiment uses magnetic surfaces on the outside support and on the patch to secure the patch to the outside support in place of hook and loop material.

FIG. 3A illustrates another alternative embodiment of the accessory mount 1 illustrated in FIG. 1A. This embodiment uses magnetic surfaces 10-11 on the outside support 3 and on the patch 7 to secure the patch 7 to the outside support 3 in place of hook and loop material 4, 8.

Figure 3B:
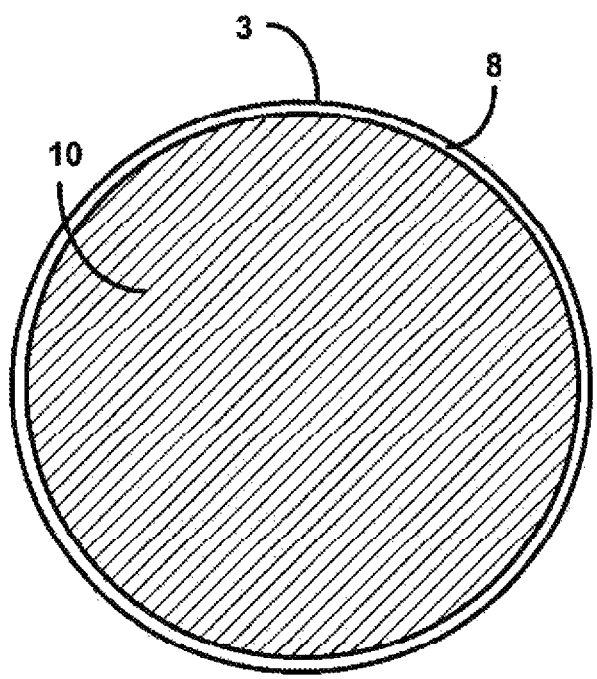
FIG. 3B illustrates a surface view of the outer surface of the outside support whose surface is magnetic material.

FIG. 3B illustrates a surface view of the outer surface of the outside support 3 whose surface is magnetic material 10. Any magnetic material that is suitable for the purpose of this invention can be used.

Figure 3C:
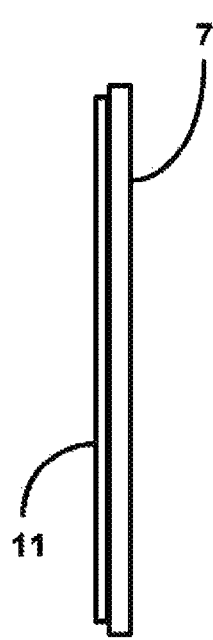
FIG. 3C illustrates an edge view of a patch that has magnetic material on one side that secures to the magnetic material on the outside support.

FIG. 3C illustrates an edge view of a patch 7 that has magnetic material 11 on one side left secures to the magnetic material 10 on the outside support 3.

FIG. 4A illustrates yet another alternative embodiment of the accessory mount 1 illustrated in FIG. 1A. This embodiment uses adhesive 13 to secure the patch 7 to the outer surface 12 of the outside support 3.

FIG. 4B illustrates a surface view of the mounting surface 12 of the outside support 3.

FIG. 4C illustrates an edge view of a patch 7 that has adhesive 13 on one side that secures to the outer surface 12 of the outside support 3. Those skilled in the art will recognize that adhesive layer 13 can be located on the patch 7, or on the outer surface 12. Likewise, any adhesive 13 that is suitable for the purpose at hand can be used.

Figure 5A:
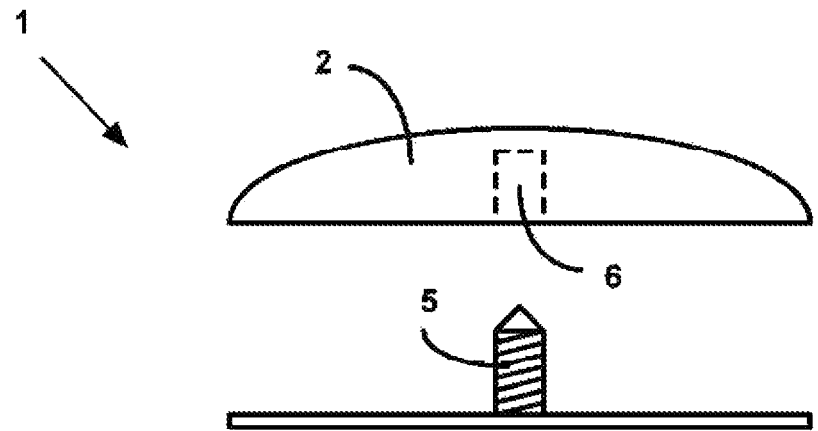
FIG. 5A illustrates a further alternative embodiment of the accessory mount illustrated in FIG. 1A. In this embodiment, the patch is an integral part of the outside support.

FIG. 5A illustrates a further alternative embodiment of the accessory mount 1 illustrated in FIG. 1A. In this embodiment, the patch 7 is an integral part of the outside support 3. A user may have multiple patches 7 that have preselected indicia or logos of some kind. In practice, the user would merely remove the outside support 3 with one type of indicia, and replace it with a substitute outside support 3 that has a different logo or indicia.

Figure 5B:
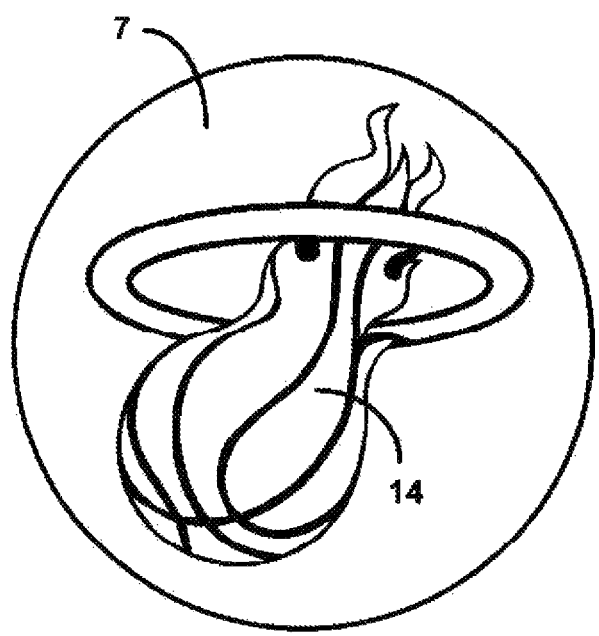
FIG. 5B illustrates a surface view of the sports logo forms the outer surface of the outside support, and is an integral part thereof.

FIG. 5B illustrates a surface view of a sports logo 14 that is an integral part of, and forms the outside surface of, the outside support 3. Those skilled in the art will recognize that the sports logo 14 can be fabricated from any suitable material, such as fabric, ceramics, wood, metal, etc.

Figure 6A:
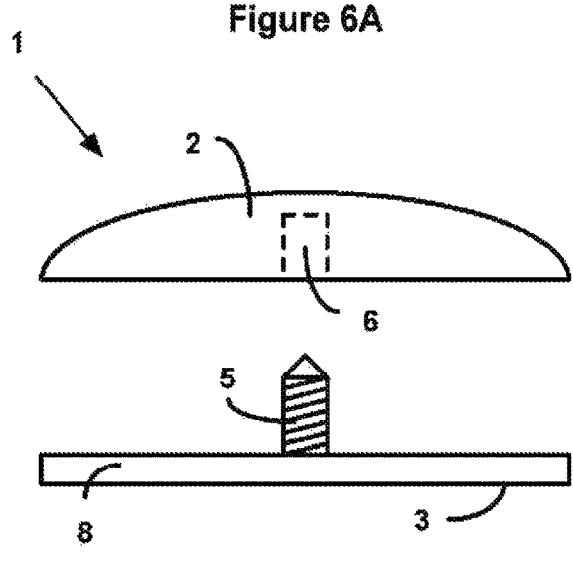
FIG. 6A illustrates a still further alternative embodiment of the accessory mount illustrated in FIG. 1A. In this embodiment, the patch has an irregular shape.

FIG. 6A illustrates a still further alternative embodiment of the accessory mount 1 illustrated in FIG. 1A. In this embodiment, the patch 7 has an irregular shape. In addition, it can be a different size and shape than the outside support 3, and is illustrated that way.

Figure 6B:
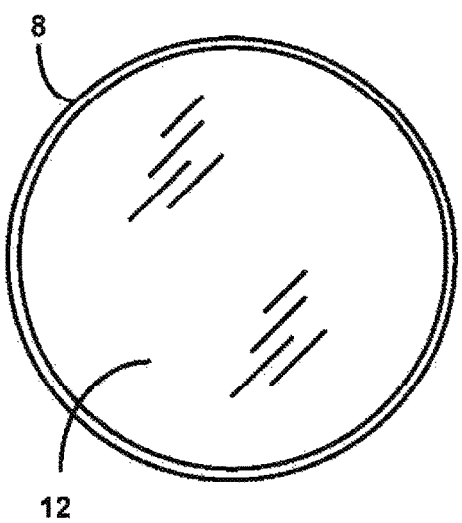
FIG. 6B illustrates a surface view of the outer surface of the outside support.

FIG. 6B illustrates a surface view of the outer surface 12 of the outside support 3. In this and the preceding embodiments, the outside support 3 has been illustrated as a circular platform. This was done for convenience, but those skilled in the art will recognize that patch support 3 can take any desired shape. Likewise, any of the embodiments can be implemented with or without the rim 8. Still further, the outside support 3 can be shaped in the same configuration as the item it is attached to, or it can keep a standard shape, such as the circle illustrated.

Figure 6C:
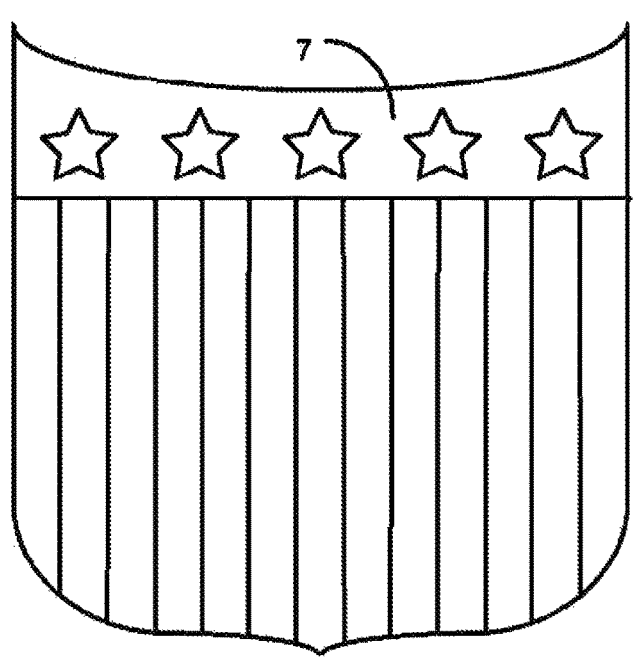
FIG. 6C illustrates a surface view of the patch that has an irregular shape and is of a different size than the outside support.

FIG. 6C illustrates a surface view of the patch 7 that has an irregular shape and is of a different size than the patch support 3 shown in FIG. 6B.

Figure 6D:
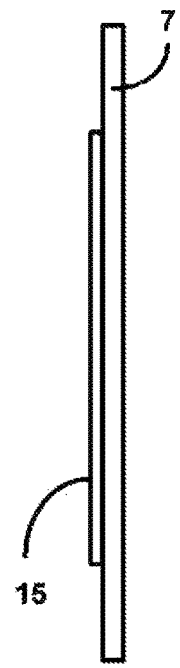
FIG. 6D illustrates an edge view of a patch has mounting material that secures to the outer surface of the outside support.

FIG. 6D illustrates an edge view of a patch 7 has mounting material 15 that secures to the mounting surface 12 of the patch support 3. Mounting material 15 can be any material suitable for securing the patch 7 the patch support 3, such as hook and loop material 4, 8, adhesive 13, magnetic material 10-11, etc. As indicated in this figure, the mounting material 15 would be sized to fit the outer surface 12 of the outside support 3.

Figure 7A:
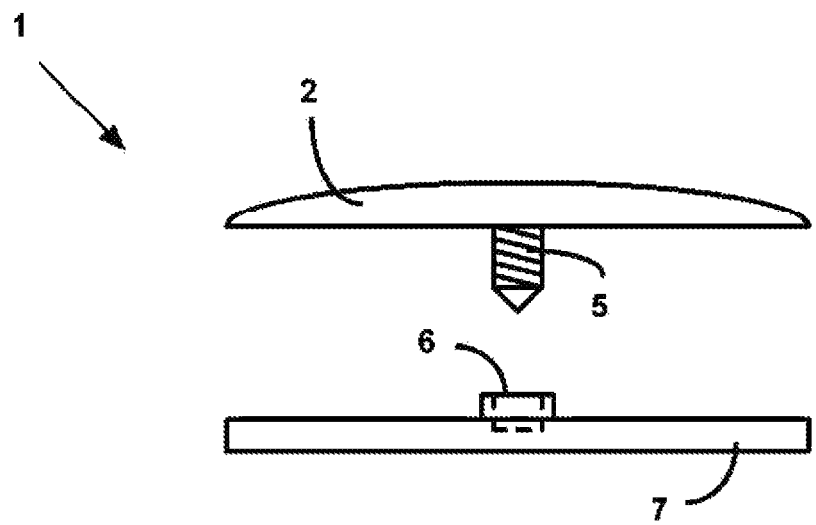
FIG. 7A illustrates yet another alternative embodiment of the accessory mount illustrated in FIG. 1A. In this embodiment, the support post extends from the inside support instead of the outside support.

FIG. 7A illustrates yet another alternative embodiment of the accessory mount 1 illustrated in FIG. 1A. In this embodiment, the support post 5 extends from the inside support 2 instead of the outside support 3.

Figure 7B:
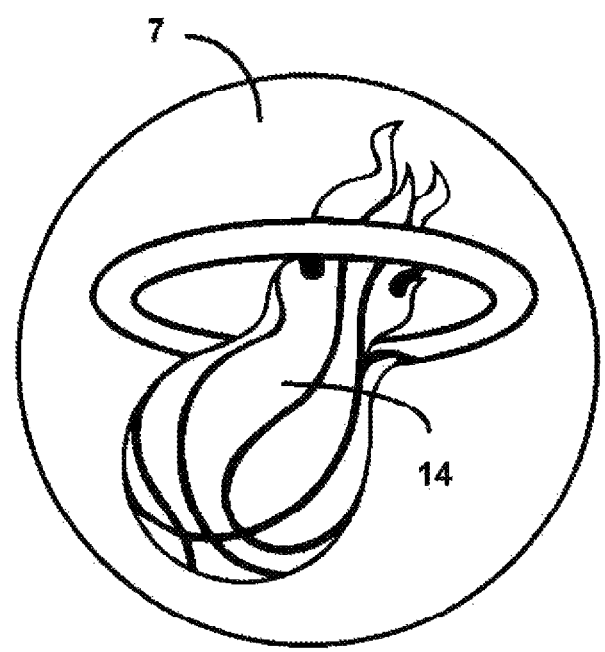
FIG. 7B illustrates a surface view of a patch having a sports logo that is intended for attachment to the outside support.

FIG. 7B illustrates a surface view of a patch 7, having a sports logo 14.

Figure 8A:
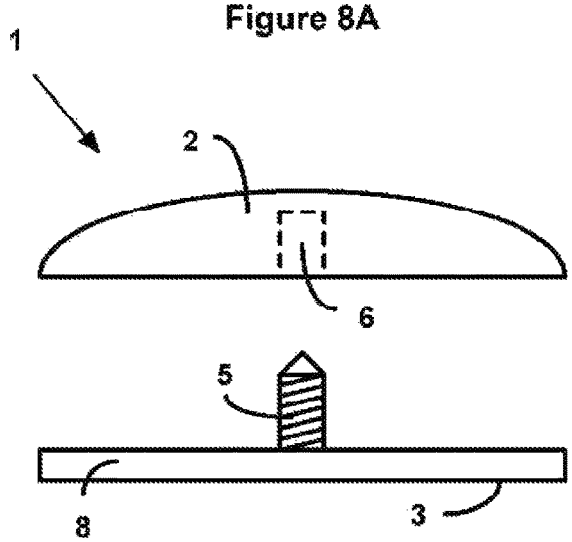
FIG. 8A illustrates another alternative embodiment of the accessory mount illustrated in FIG. 6A.

In regard to FIG. 8A, this figure illustrates a variation of the embodiment of the accessory mount 1 illustrated in FIG. 6A. In this embodiment, that patch 7 is replaced by a transparent sleeve 16 (shown in FIG. 8C) that holds printed material 17 (shown in FIG. 8C).

Figure 8B:
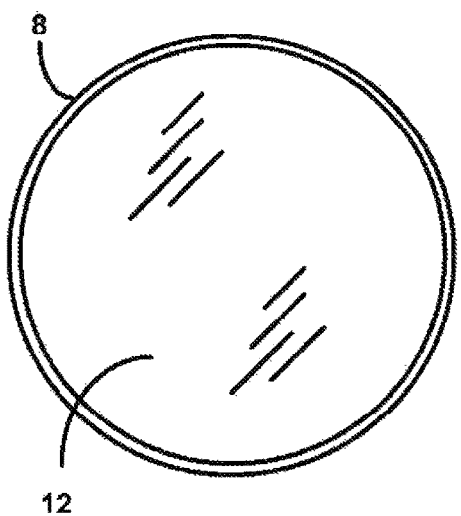
FIG. 8B illustrates a surface view of the outer surface of the outside support.

FIG. 8B illustrates a surface view of the outer surface of the outside support 3. The outside support functions in the same manner as the patch support 3 in FIGS. 6A-D.

Figure 8C:
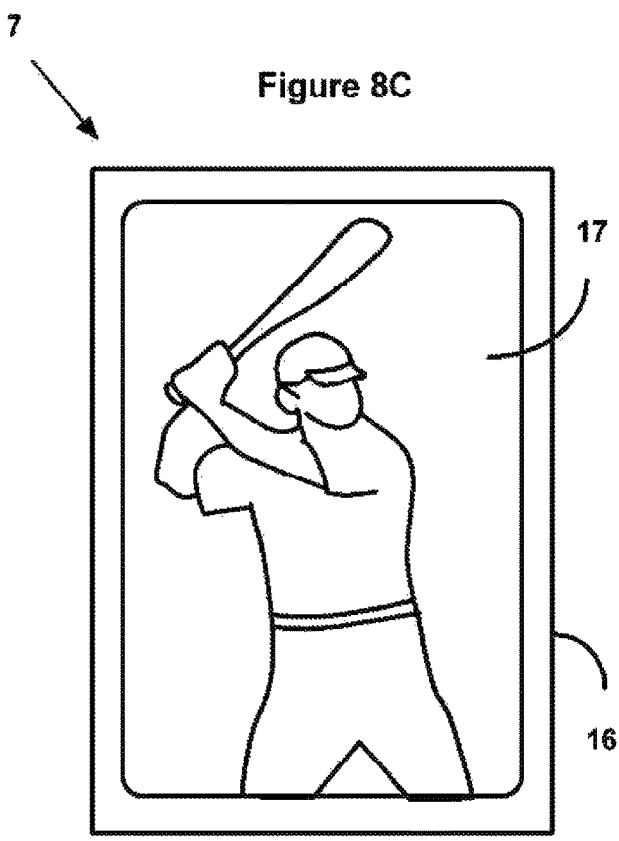
FIG. 8C illustrates a surface view of the patch. In this embodiment, the patch is a transparent sleeve that is designed to hold insertable printed material. In this example, the sleeve holds a baseball card.

FIG. 8C illustrates a surface view of the patch 7. In this embodiment, the patch 7 is a transparent sleeve 16 that is designed to hold insertable printed material 17. In this example, the insertable printed material 16 is a baseball card.

Figure 8D:
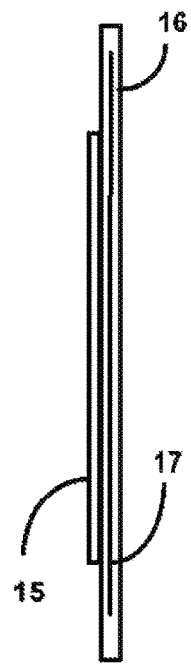
FIG. 8D illustrates an edge view of a patch that has mounting material that secures to the outer surface of the outside support.

FIG. 8D illustrates an edge view of a patch 7 that has mounting material 15 that secures to the outer surface 12 of the outside support 3.

Those skilled in the art will recognize that the attachment of the patch 7 to the outside support 3 in the various embodiments is interchangeable. Any suitable means, such as hook and loop, adhesive, magnets, etc., can be used.

Figure 9A:
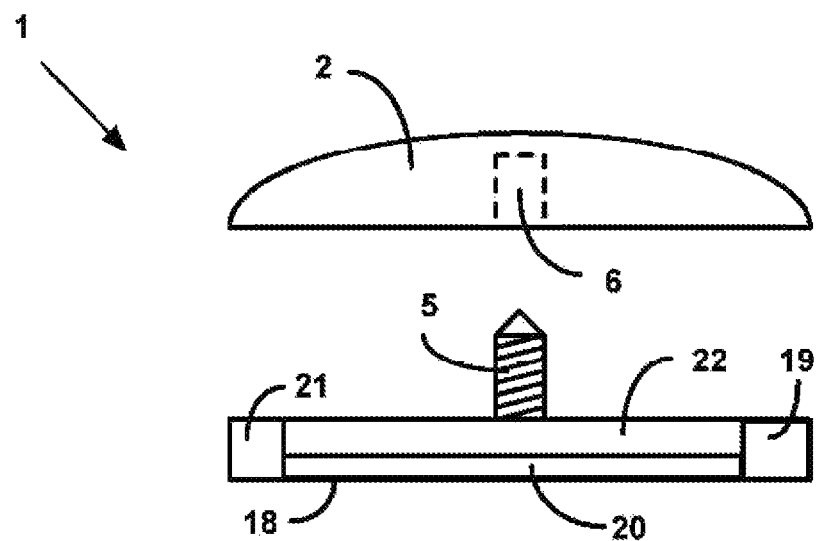
FIG. 9A illustrates another alternative embodiment of the accessory mount illustrated in FIG. 1A. In this embodiment, an audio/video device is used.

FIG. 9A illustrates another alternative embodiment of the accessory mount 1 illustrated in FIG. 1A. In this embodiment, the accessory is an audio/video device 18. The audio/video device 18 secures to the outside support 3 in the same manner as the other embodiments. Audio/video device 18 incorporates a video display 20, an audio speaker 21, a power source 19, and a control unit 22. The control unit includes storage for video and/or audio data that is displayed on the video display 20 and/or output via audio speaker 21. The audio/video device 18 can be preprogrammed or have the capability of updating or modifying the audio/video data on a dynamic basis through known techniques. This allows the user to display any message they desire in an entertaining manner.

Figure 9B:
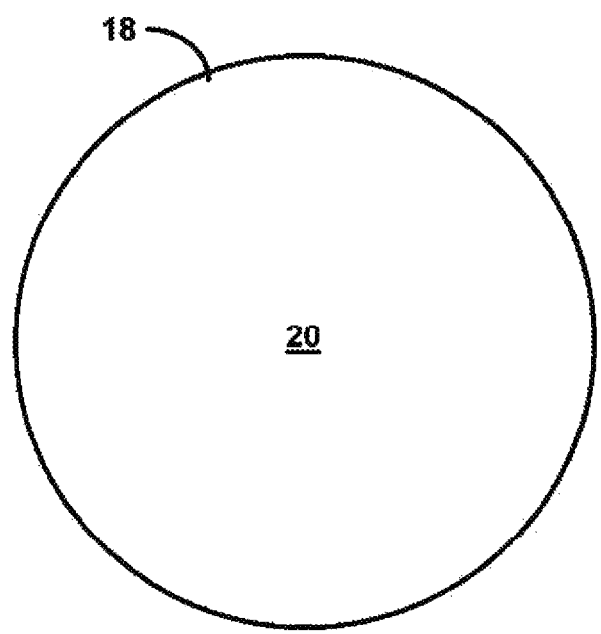
FIG. 9B illustrates a surface view of an audio/video device.

FIG. 9B illustrates a surface view of the audio/video patch 18 and shows the display 20. The audio speaker 21 can optionally be placed on the surface or on the side of the audio/video patch 18.

Figure 10A:
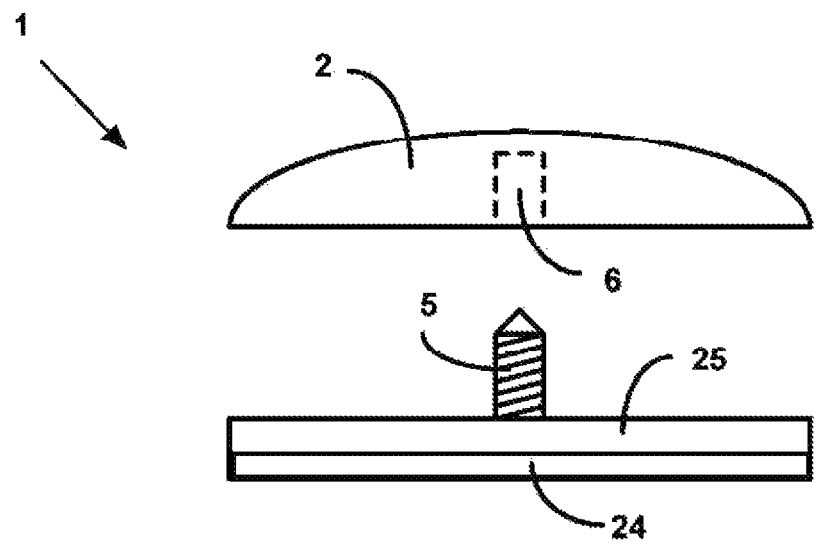
FIG. 10A illustrates another alternative embodiment of the accessory mount illustrated in FIG. 1A. In this embodiment, a Bluetooth receiver and output device is used.

FIG. 10A illustrates another alternative embodiment of the accessory mount 1 illustrated in FIG. 1A. In this embodiment, the accessory is a Bluetooth audio device 23. The Bluetooth audio device 23 secures to the outside support 3 in the same manner as the other embodiments. Bluetooth audio device 23 incorporates an audio speaker 24, and a receiver 25. The receiver 25 includes a power supply, and an on/off switch that were omitted from the drawing for ease of illustration. The Bluetooth audio device 23 can play audio data on a dynamic basis through known techniques using a variety of Bluetooth capable devices (e.g., iPod™, Smart phone, MP3 device, etc.) as a music data source. This allows the user to play a wide variety of music of their choice.

Figure 10B:
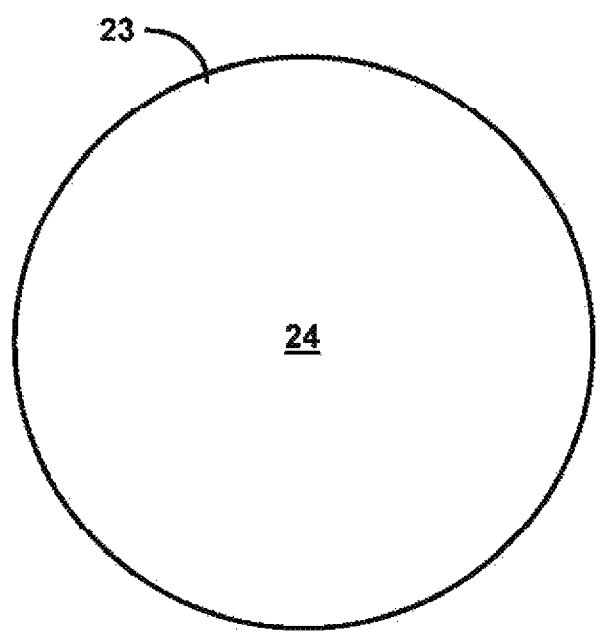
FIG. 10B illustrates a surface view of the Bluetooth output device.

FIG. 10B illustrates a surface view of the Bluetooth audio device 23 and shows the audio speaker 24. The audio speaker 24 can optionally be placed on the surface or on the side of the Bluetooth audio device 23.

Figure 11A:
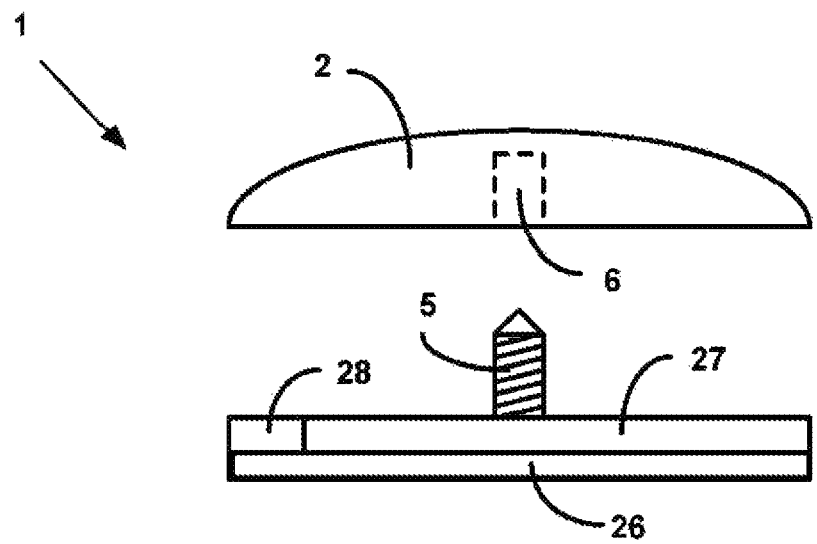
FIG. 11A illustrates another alternative embodiment of the accessory mount illustrated in FIG. 1A. In this embodiment, an LED lamp is used as the output device.

FIG. 11A illustrates another alternative embodiment of the accessory mount 1 illustrated in FIG. 1A. In this embodiment, the accessory is an LED lamp. This embodiment allows the user to convert a conventional hat into a hat with an integral light to aid when working in dark environments.

Figure 11B:
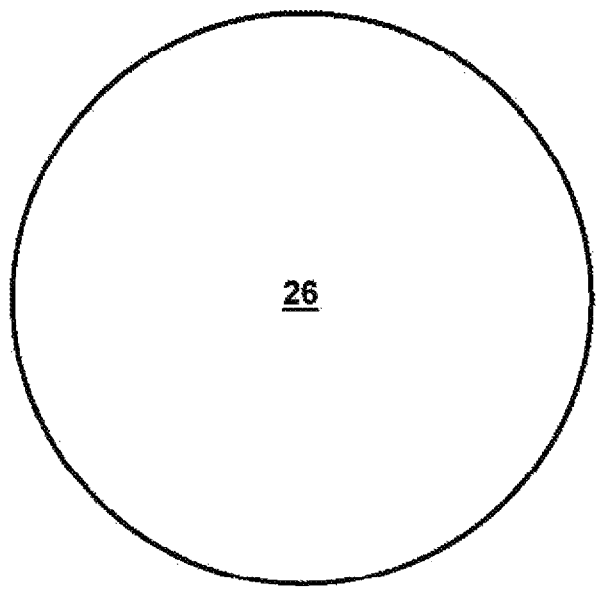
FIG. 11B illustrates a surface view of the LED lamp output device.

FIG. 11B illustrates a surface view of the LED lamp 26.

Figure 12A:
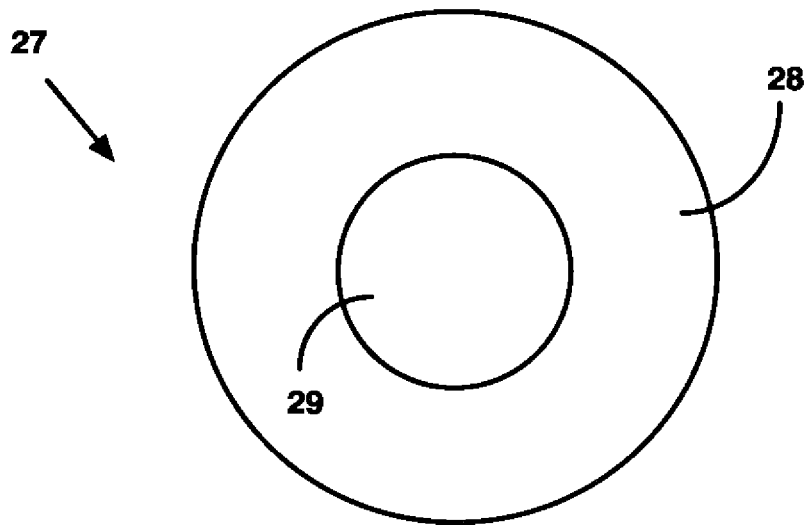
FIG. 12A illustrates another alternative embodiment of the accessory mount, which shows a top view of the inside half of the magnetic attachment. In this figure, the inside half of the magnetic attachment is used in place of the post used in the previous embodiments.

FIG. 12A illustrates another alternative embodiment of the accessory mount 1. In this figure, the inside half 27 of the accessory mount 1 contains a magnet 29. In addition, support surface 28 is also shown. The support surface 28 provides additional mechanical support for the outside half 30 of the accessory mount 1. The preferred embodiment envisions a magnet with a 38 mm diameter with a 3 mm thickness. However, those skilled in the art will recognize that the dimensions of the magnet can vary based on the magnet strength.

Figure 12B:
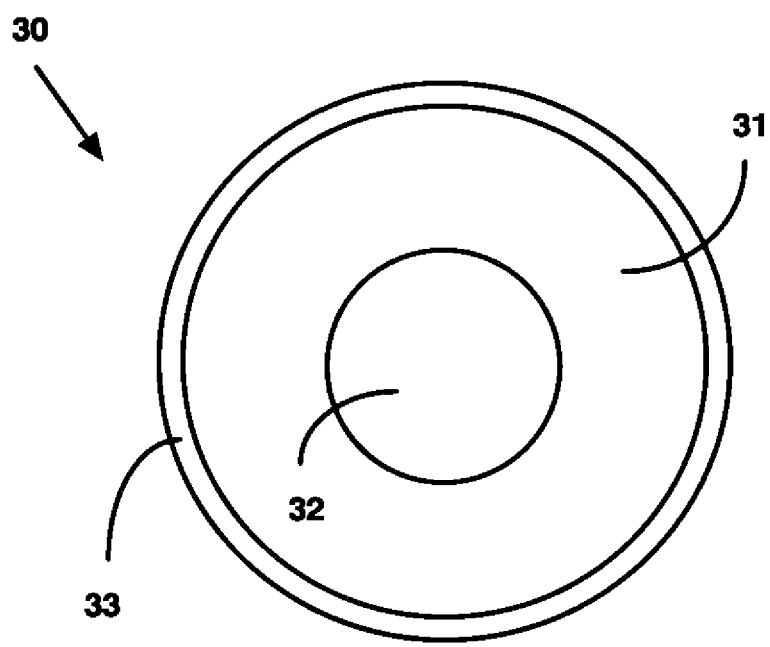
FIG. 12B illustrates another alternative embodiment of the accessory mount, which shows a rear view of the outside half of the magnetic attachment. In this figure, the outside half of the magnetic attachment is used in combination with the inside half of the magnetic attachment shown in FIG. 12A.

FIG. 12B illustrates the outside half 30 of the accessory mount. In this figure, the outside half 30 of the accessory mount 1 is used in combination with the inside half 27 of the accessory mount 1 shown in FIG. 12A. The outside half 30 of the accessory mount 1 also contains a magnet 32 that corresponds with magnet 29 on the inside half 27. The magnets 29, 32 have sufficient strength to hold themselves together when placed on opposite sides of an item 35 (shown below in FIGS. 12E, 12F and 14). An advantage of using a magnetic structure instead of a pin structure, as discussed above in regard to the previous embodiments, is that the magnets 29, 32 do not do any damage to the surface of an item 35 that they are secured to. The outside half 30 also shows the patch mounting surface 31 and an optional peripheral edge 33.

For ease of illustration, both the inside half 27 and the outside half 30 are illustrated. However, those skilled in the art will recognize that the invention can also be implemented using a single magnet in either the inside half 27 or the outside half 30, as long as the other half is fabricated from material that can be held in place by a magnet.

Figure 12C:
FIG. 12C illustrates sample patch that can be used with the accessory mount.

FIG. 12C illustrates patch 34 that can be used with the accessory mount 1. The patch 34 can be any ornamental design, such as patriotic, religious, athletic, commercial, aesthetic symbols, social message, etc. For ease of illustration, the patch 34, as well as the accessory mount 1, are illustrated as having a circular design. However, as was the case with the forgoing embodiments, the patch 34 and the accessory mount 1 can be fabricated in any desired shape.

Figure 12D:
FIG. 12D illustrates the sample patch secured to the outside half of the magnetic attachment used by the accessory mount.

FIG. 12D illustrates the patch 34 secured to the outside half of the accessory mount. In this figure, an optional peripheral edge 33 is shown. However, those skilled in the art will realize that the optional peripheral edge 33 can be eliminated so that the patch 34 can extend to cover the outside half 30 of the accessory mount 1.

Figure 12E:
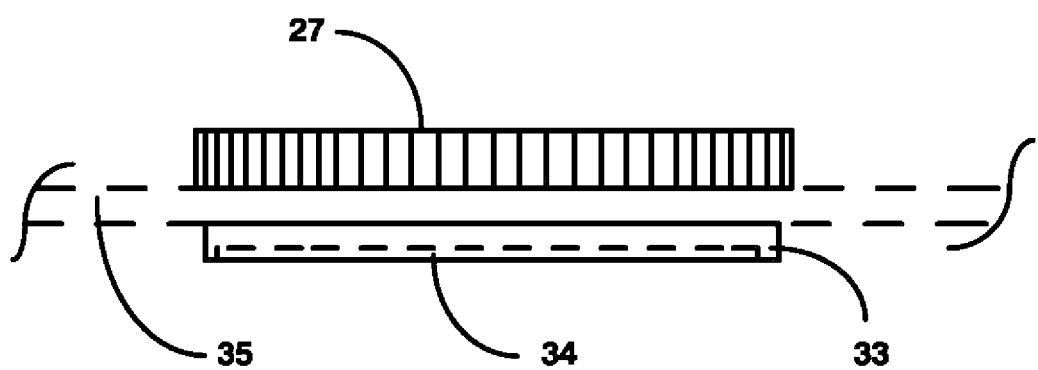
FIG. 12E is a side edge view that illustrates the inside and outside halves of the accessory mount secured to an item. This view illustrates a patch positioned within a peripheral edge of the outside half of the accessory mount.

FIG. 12E is a side edge view that illustrates the inside and outside halves 27, 30 of the accessory mount 1 secured to an item 35. This view illustrates a patch 34 positioned within a peripheral edge 33 of the outside half 30 of the accessory mount 1.

Figure 12F:
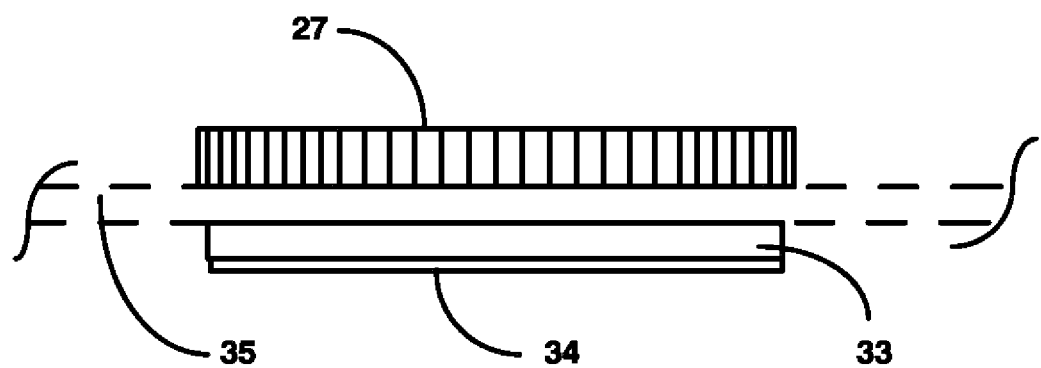
FIG. 12F is a side edge view that illustrates the inside and outside halves of the accessory mount secured to an item. This view illustrates a patch positioned on the surface of the accessory mount.

FIG. 12F is a side edge view that illustrates the inside and outside halves 27, 30 of the accessory mount 1 secured to an item 35. This view illustrates the patch 34 positioned on the surface of the accessory mount 1, but does not have the peripheral edge 33.

Figure 13A:
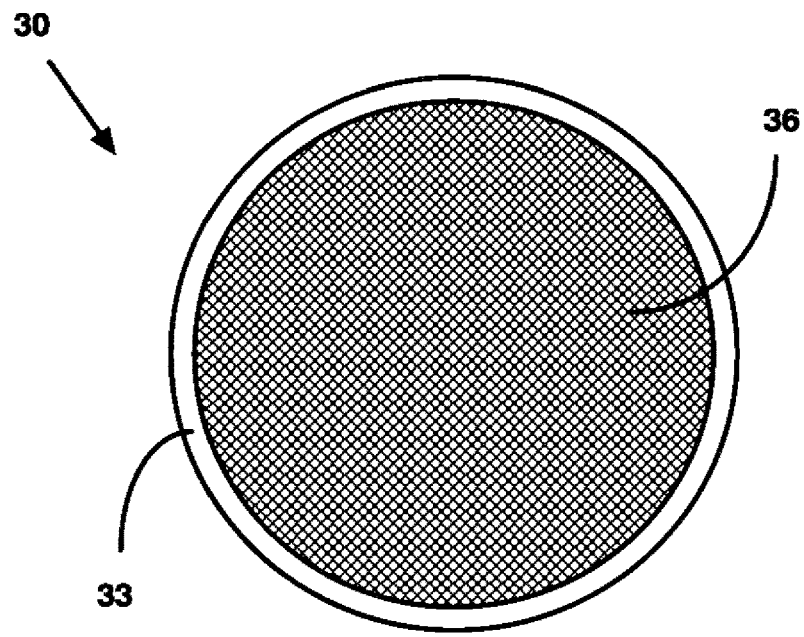
FIG. 13A is a front view that illustrates the outside half of the accessory mount. This view illustrates a patch attachment surface for securing a patch.

FIG. 13A is a front view of the accessory mount 1 that illustrates the outside half 30 of the accessory mount 1. This view illustrates a patch attachment surface 36 for securing a patch 34 to the outside half 30 of the accessory mount 1. The attachment surface can be hook and loop material, adhesives, double stick tape, or any other suitable material.

Figure 13B:
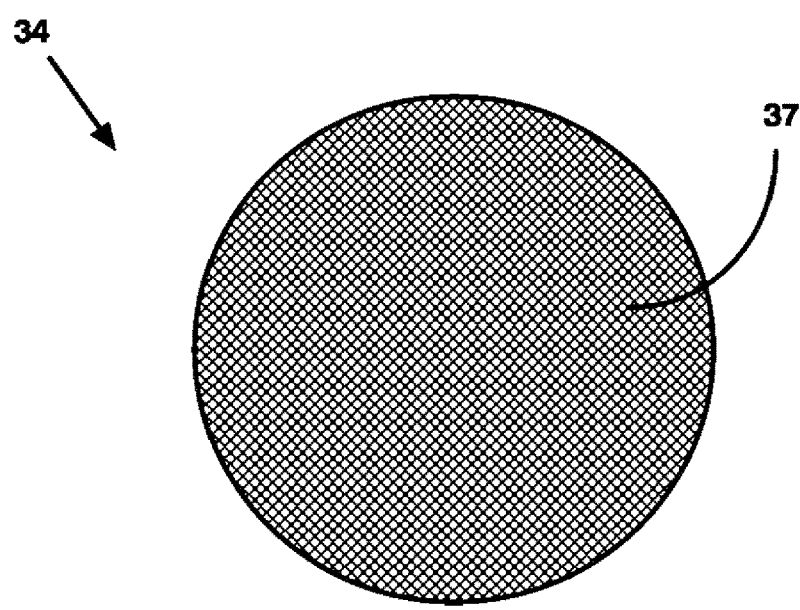
FIG. 13B is a rear view of a patch. This view illustrates the patch attachment surface for securing the patch to the accessory mount.

FIG. 13B is a rear view of a patch 34. This view illustrates the patch attachment surface 37 for securing the patch 34 to the accessory mount 1. As noted above, the attachment surface can be hook and loop material, adhesives, or any other suitable material. In addition, if the patch 34 is fabricated with magnetic material, it can also be secured in place by the magnet 32 in the outside half 30 of the accessory mount 1.

Figure 14:
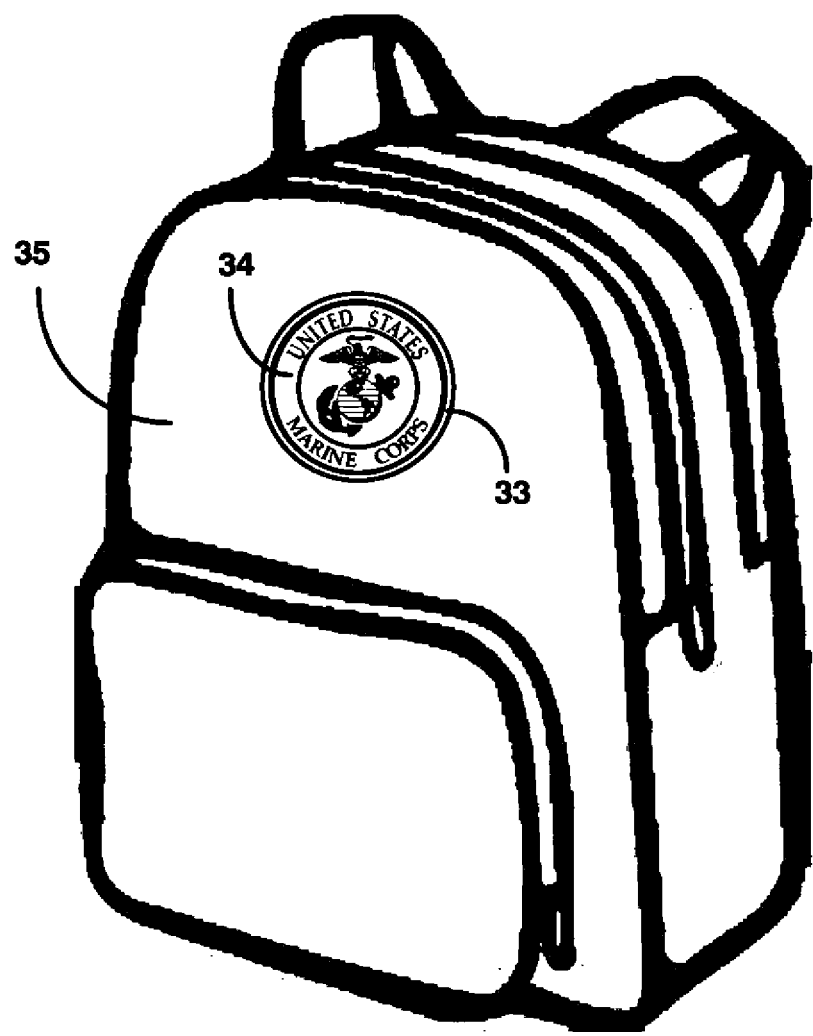
FIG. 14 illustrates the accessory mount, displaying a patch on an item.

FIG. 14 illustrates the accessory mount 1, displaying a patch 34 on an item 35. While a conventional backpack is illustrated as the item 35, the accessory mount 1 can be used with any type of item, such as clothing, luggage, purses, etc.

As can be seen, this embodiment can be used without risk of causing any damage to an item.

The forgoing embodiments have been discussed in term of a mounting accessory 1 that supports a separate patch 34. However, the patch 34 can alternatively be an integral component of the outside half. This would eliminate the need for securing a separate patch 34 to the accessory mount 1.

While the present invention has been described in its preferred form in terms of certain embodiments with a certain degree of particularity, alterations and permutations of these embodiments will be apparent to those skilled in the art. Accordingly, its understood that the above descriptions of exemplary embodiments does not define or constrain this disclosure, and that the present disclosure of the preferred form has been made only by way of example and that numerous changes, substitutions, and alterations in the details of construction and the combination and arrangement of parts may be resorted to without departing from the spirit and scope of the invention.

I claim:

1. An accessory mounting system, comprising:
   a) first circular disc having:
      1) a first side with a flat surface, and
      2) a second side having a first circular magnet affixed thereto;
   b) a second circular disc having:
      1) a first side with a flat surface,
      2) a second side with a flat surface having a second circular magnet affixed thereto, wherein when the first and second circular discs are brought into proximity of each other, the first and second circular magnets are attracted to each other, and the entire flat surface of the first side of the second circular disc contacts the entire flat surface of the first side of the first circular disc;
      3) a peripheral edge extending around a circumference of the flat surface of the second side of the second circular disc;
      4) the second side having a circular loop portion of hook and loop fabric disposed on an entire area of the flat surface of the second side, except for the peripheral edge, such that the hook and loop fabric does not extend to an edge of the second side;

c) a circular fabric patch having:
1) a decorative design on a first side;
2) a circular hook portion of hook and loop fabric disposed on an entire area of a second side;
3) wherein the fabric patch is sized to cover the entire area of the flat surface of the second side, except for the peripheral edge, such that the fabric patch does not extend to an edge of the second side when the circular hook portion of hook and loop fabric is placed on the second side of the second circular disc.

2. The accessory mounting system of claim 1, further comprising an audio video device having:
1) an apparatus on a first side of the audio video device for playing audio and video;
2) a circular hook portion of hook and loop fabric disposed on an entire area of a second side of the audio video device;
3) wherein the apparatus is sized to cover an entire area of the second side of the second circular disc when the circular hook portion of hook and loop fabric of the audio video device is placed on the second side of the second circular disc.

3. The accessory mounting system of claim 1, further comprising an illumination device having:
1) an apparatus on a first side of the illumination device for producing light;
2) a circular hook portion of hook and loop fabric disposed on an entire area of a second side of the illumination device;
3) wherein the apparatus is sized to cover an entire area of the second side of the second circular disc when the circular hook portion of hook and loop fabric of the illumination device is placed on the second side of the second circular disc.

4. The accessory mounting system of claim 1, further comprising a Bluetooth device having:
1) an apparatus on a first side of the Bluetooth device for transmitting and receiving radio frequency signals;
2) a circular hook portion of hook and loop fabric disposed on an entire area of a second side of the Bluetooth device;
3) wherein the apparatus is sized to cover an entire area of the second side of the second circular disc when the circular hook portion of hook and loop fabric of the Bluetooth device is placed on the second side of the second circular disc.

5. The accessory mounting system of claim 1, further comprising a mobile phone having:
1) an apparatus on a first side of the mobile phone for transmitting and receiving radio frequency signals;
2) a circular hook portion of hook and loop fabric disposed on an entire area of a second side of the mobile phone;
3) wherein the apparatus is sized to cover an entire area of the second side of the second circular disc when the circular hook portion of hook and loop fabric of the mobile phone is placed on the second side of the second circular disc.

6. The accessory mounting system of claim 1, further comprising an audio speaker having:
1) an apparatus on a first side of the audio speaker for transmitting and receiving radio frequency signals;
2) a circular hook portion of hook and loop fabric disposed on an entire area of a second side of the audio speaker;
3) wherein the apparatus is sized to cover an entire area of the second side of the second circular disc when the circular hook portion of hook and loop fabric of the audio speaker is placed on the second side of the second circular disc.

* * * * *